US006128334A

United States Patent [19]

Dapper et al.

[11] Patent Number: 6,128,334

[45] Date of Patent: Oct. 3, 2000

[54] RECEIVER ADDRESSABLE AM COMPATIBLE DIGITAL BROADCAST SYSTEM

[75] Inventors: Mark J. Dapper, Cincinnati; Barry W. Carlin, Greenhills; Michael J. Geile, Batavia, all of Ohio

[73] Assignee: USA Digital Radio, Inc., Columbia, Md.

[21] Appl. No.: 08/803,714

[22] Filed: Feb. 21, 1997

[51] Int. Cl.7 .............................. H04L 25/00; H04L 27/00

[52] U.S. Cl. .......................... 375/216; 375/260; 375/261; 375/268; 375/298; 370/265; 370/267; 370/493

[58] Field of Search .................................... 375/216, 260, 375/261, 268, 298, 300, 320, 222; 370/493, 480, 264, 265, 266, 267; 455/38.1

[56] References Cited

U.S. PATENT DOCUMENTS

| | | | |
|---|---|---|---|
| 4,143,322 | 3/1979 | Shimamura . | |
| 4,255,713 | 3/1981 | Yoshida . | |
| 4,318,049 | 3/1982 | Mogensen . | |
| 4,466,108 | 8/1984 | Rhodes . | |
| 4,484,337 | 11/1984 | Leclert et al. . | |
| 4,550,415 | 10/1985 | Debus, Jr. et al. . | |
| 4,787,096 | 11/1988 | Wong . | |
| 4,795,986 | 1/1989 | Ceroni et al. . | |
| 4,843,583 | 6/1989 | White et al. . | |
| 4,847,797 | 7/1989 | Picchi et al. . | |
| 4,866,666 | 9/1989 | Francisco | 364/900 |
| 4,879,728 | 11/1989 | Tarallo . | |
| 4,928,100 | 5/1990 | Andros et al. | 340/825.44 |
| 5,019,824 | 5/1991 | Kumar . | |
| 5,113,142 | 5/1992 | Yoshikawa . | |
| 5,148,451 | 9/1992 | Otani et al. . | |
| 5,175,747 | 12/1992 | Murakami . | |
| 5,214,671 | 5/1993 | Nakai . | |
| 5,214,674 | 5/1993 | Sayegh . | |
| 5,243,624 | 9/1993 | Paik et al. . | |
| 5,247,543 | 9/1993 | Tsuda et al. . | |
| 5,268,930 | 12/1993 | Sendyk et al. . | |
| 5,278,826 | 1/1994 | Murphy et al. | 370/76 |
| 5,410,541 | 4/1995 | Hotto | 370/496 |
| 5,448,590 | 9/1995 | Kostic . | |
| 5,465,396 | 11/1995 | Hunsinger et al. | 455/61 |
| 5,481,532 | 1/1996 | Hassan et al. | 370/16 |
| 5,559,792 | 9/1996 | Bottoms et al. | 370/20 |
| 5,559,830 | 9/1996 | Dapper et al. | 375/230 |
| 5,588,022 | 12/1996 | Dapper et al. | 375/216 |
| 5,606,576 | 2/1997 | Dapper et al. | 375/268 |
| 5,633,896 | 5/1997 | Carlin et al. | 375/340 |
| 5,642,379 | 6/1997 | Bremer | 375/216 |
| 5,673,292 | 9/1997 | Carlin | 375/269 |
| 5,745,525 | 4/1998 | Hunsinger et al. | 375/285 |
| 5,757,854 | 5/1998 | Hunsinger et al. | 375/260 |
| 5,764,706 | 6/1998 | Carlin et al. | 375/326 |
| 5,850,415 | 12/1998 | Hunsinger et al. | 375/216 |
| 5,878,077 | 3/1999 | Betts | 375/222 |
| 5,949,796 | 9/1999 | Kumar . | |

*Primary Examiner*—Stephen Chin
*Assistant Examiner*—Michael W. Maddox
*Attorney, Agent, or Firm*—Robert P. Lenart; Eckert Seamans Cherin & Mellott, LLC

[57] ABSTRACT

The present invention provides for a receiver addressable AM compatible digital broadcast system and method. The digital broadcast signal includes a plurality of digitally modulated signals and an analog signal. A transmitter useable within the system includes a data combiner for generating an aggregate digital data signal, and a waveform generator for forming the digital broadcast signal. A receiver useable within the system comprises a waveform detector for separating the signals and a data parser for separating the digitally modulated signals. The present invention further provides for a method of selectively transmitting data via a digital broadcast signal. The method includes forming the digital broadcast signal from an analog signal and a plurality of digitally modulated signals, transmitting and receiving the digital broadcast signal. The method further includes the steps of separating the analog signal from the digitally modulated signals, separating the digitally modulated signals, comparing a destination identification signal with an identification code, and passing a user defined message signal responsive to the destination identification digital signal corresponding to the identification code.

12 Claims, 6 Drawing Sheets

RECEIVER ADDRESSABLE AM COMPATIBLE DIGITAL BROADCAST SYSTEM

BACKGROUND OF THE INVENTION

1. Field of the Invention

This invention relates to broadcasting digitally modulated signals and an analog signal within the same frequency channel assignment, and more particularly to receiver addressable digital broadcasting techniques.

2. Description of the Related Art

There has been increasing interest in the possibility of broadcasting digitally encoded audio signals to provide improved audio fidelity. Several approaches have been suggested. One method simultaneously broadcasts analog and digital signals in a standard AM broadcasting channel. An amplitude modulated radio frequency signal having a first frequency spectrum is broadcast. The amplitude modulated radio frequency signal includes a first carrier modulated by an analog program signal. Simultaneously, a plurality of digitally modulated carrier signals are broadcast within a bandwidth which encompasses the first frequency spectrum. Each of the digitally modulated carrier signals is modulated by a portion of a digital program signal. A first group of the digitally modulated carrier signals lies within the first frequency spectrum and is modulated in quadrature with the first carrier signal. Second and third groups of the digitally modulated carrier signals lie outside of the first frequency spectrum and are modulated both in-phase and in-quadrature with the first carrier signal. Both transmitters and receivers are provided in accordance with that method.

The waveform in such an AM compatible digital broadcasting system has been formulated to employ multiple digital carriers to carry a composite data rate suitable for high quality audio reproduction.

It is desired to transfer broadcast program material concurrently with destination specific information permitting the transmission of messages to a preselected receiver(s). For example, paging systems are increasingly popular for relaying destination specific messages and other information. Therefore, there is a need for a broadcasting system which transmits digitally encoded audio signals for improved audio fidelity and has detector addressable capabilities for transmitting receiver specific information.

The invention solves this need by providing for a receiver addressable AM compatible digital broadcast system.

SUMMARY OF THE INVENTION

The present invention provides for a transmitter and receiver useable within a receiver addressable AM compatible digital broadcast system. The broadcast signal includes a plurality of digitally modulated signals and an amplitude modulated signal. The digitally modulated signals may include a commercial broadcast program signal, destination identification signal and a user defined message signal.

The transmitter useable within the system includes a data combiner for generating an aggregate digital data signal from the digitally modulated signals and a waveform generator electrically coupled with the data combiner and at least one analog input terminal for combining the aggregate digital data signal with the analog amplitude modulated signal to form the broadcast signal.

One embodiment of the transmitter further comprises an audio processor coupled with at least one analog input terminal for providing processing of a broadcast program analog signal, and an analog-to-digital converter intermediate the audio processor and the waveform generator for generating a digitized signal.

The preferred waveform generator comprises a summation point electrically coupled with the data combiner and the analog-to-digital converter for combining a portion of the aggregate digital data signal with the analog signal. The waveform generator may further comprise at least one digital-to-analog converter electrically connected to the summation point for generating a baseband analog signal, and a mixer electrically connected to at least one digital-to-analog converter for modulating the baseband analog signal with a radio frequency carrier to generate a portion of the broadcast signal.

The frequency range of the digitally modulated signals preferably encompasses the frequency spectrum of the analog amplitude modulated signal. The destination identification digital signal is preferably an identification code which corresponds to at least one receiver within an amplitude modulated compatible digital broadcast system.

The receiver useable within the system comprises a waveform detector for separating the digitally modulated signals and the analog amplitude modulated signal and a data parser electrically connected to the waveform detector for separating the commercial broadcast program signal and the destination identification signal and the user defined message signal. The receiver further comprises a message gate electrically connected to the data parser for selectively passing the user defined message signal responsive to the destination identification signal corresponding to an identification code of the receiver.

A preferred embodiment of the receiver further comprises an identification decoder electrically connected to the data parser and the message gate for comparing the destination identification signal with the identification code.

The waveform detector preferably utilizes the phase of a carrier signal of the analog amplitude modulated signal as a phase reference to demodulate the digitally modulated signals, and includes a filter for extracting the analog amplitude modulated signals.

The present invention further provides for a method of selectively transmitting data via an AM compatible digital broadcast signal. The method includes forming the AM compatible digital broadcast signal from an analog amplitude modulated signal and a plurality of digitally modulated signals, transmitting and receiving the AM compatible digital broadcast signal. The method further includes the steps of separating the analog amplitude modulated signal from the digitally modulated signals, separating the digitally modulated signals, comparing a destination identification digital signal with an identification code, and passing a user defined message digital signal responsive to the destination identification digital signal corresponding to the identification code. The user defined message may thereafter be displayed.

A complete understanding of the invention will be obtained from the following description and the accompanying figures.

DETAILED DESCRIPTION OF THE PREFERRED EMBODIMENTS

Figure 1:
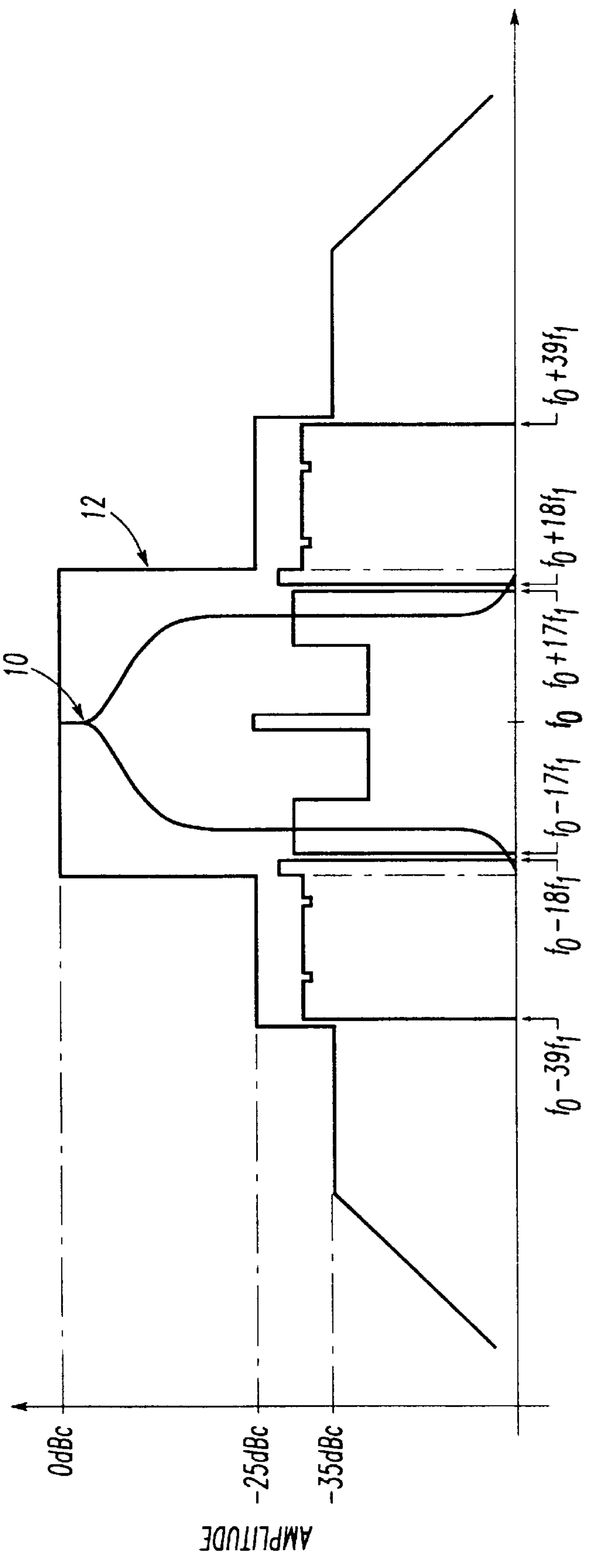
FIG. 1 is a spectral representation of a composite analog AM and digital broadcast signal.

A method of simultaneously broadcasting both an analog amplitude modulated signal and a digital signal on the same channel assignment as the existing analog AM broadcasting allocation is described in U.S. Pat. No. 5,588,022 entitled "Method and Apparatus for AM Compatible Digital Broadcasting", assigned to the assignee hereof, and incorporated herein by reference.

When this technique is applied to AM radio broadcasts, the broadcasting can be done in the same frequency band and at the same carrier frequencies that are currently allocated for AM broadcasting. The technique of simultaneously broadcasting the digital signal in the same channel as an analog AM signal is called in-band on-channel (IBOC) broadcasting. The need to prevent mutual interference places restrictions on the digital waveform that is placed beneath the analog AM spectrum. This broadcasting is accomplished by transmitting a digital waveform by way of a plurality of carriers, some of which are modulated in-quadrature with the analog AM signal and are positioned within the spectral region where the standard AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. There are various methods for producing orthogonally related signals.

In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [5+1 dB/kHz] below the unmodulated analog carrier level.

FIG. 1 shows the spectrum of an AM compatible digital broadcasting signal having carriers positioned in accordance with the teachings of the incorporated U.S. Pat. No. 5,588,022. Curve 10 represents the standard broadcasting amplitude modulated carrier signal, wherein the carrier has a frequency of $f_0$. The FCC emissions mask is represented by item number 12. Recent advances in source coding, such as the German Institut Für Rundfunktechnik MUSICAM (Masking-pattern Adapted Subband Coding And Multiplexing) algorithm, have shown that enhanced audio quality for stereo program material can be achieved by broadcasting digital signals at rates as low as 96 kilobits per second (kbps). Waveforms which support this data rate can be inserted within the FCC emissions mask presently allocated for AM stations by employing bandwidth efficient modulation techniques.

The digitally modulated carriers are generated via orthogonal frequency division multiplexing (OFDM). This format enables the spectra of these carriers to be overlapped without any intervening guard bands, thereby optimizing spectral utilization. However, a guard interval can be used in the time domain to compensate for signal timing jitter. The OFDM modulation technique is extremely beneficial for successful digital broadcast operation since bandwidth is a premium commodity in the AM band. An additional advantage is that there is no need to isolate the digital broadcast carriers from each other via filtering in either the transmitter or receiver since the orthogonality condition of OFDM minimizes such interference.

The OFDM waveform is composed of a series of data carriers spaced at 500 Hz. This produces enhanced spectral containment and enables the AM digital broadcast waveform to extend extremely close to the edge of the FCC emissions mask, yet remain compliant. An additional feature of this approach is that the amplitude of each carrier can be tailored to boost signal power in areas where high interference levels are anticipated, such as locations close to the carrier frequencies of interferers. This strategy produces an optimal allocation of signal energy and thereby maximizes the potential AM digital broadcast coverage region.

Figure 2:
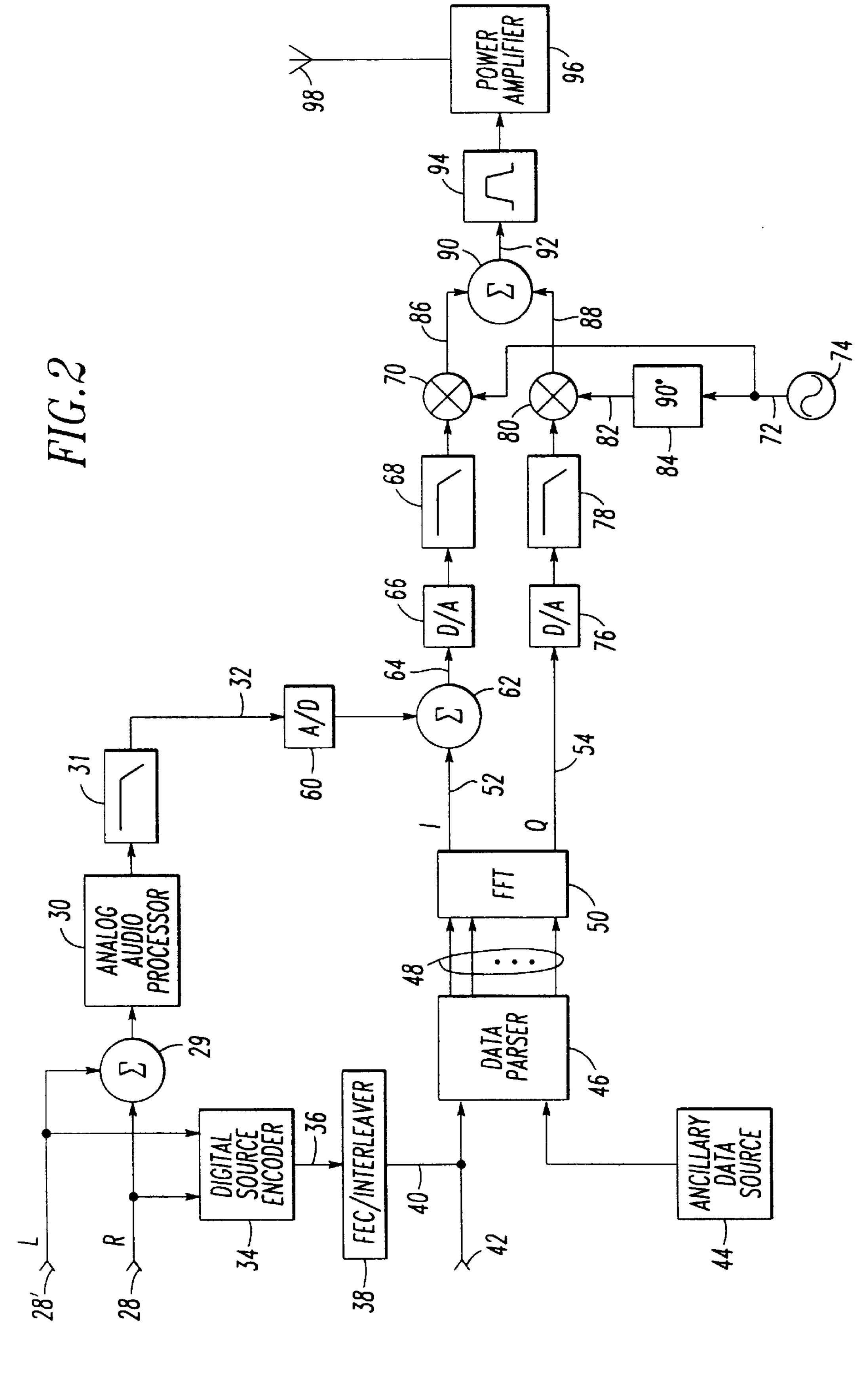
FIG. 2 is a block diagram of one embodiment of a transmitter.

FIG. 2 is a block diagram of a transmitter. An analog program signal (which in this example includes right and left stereo portions) that is to be transmitted is impressed onto input terminals 28 and 28'. The left and right channels are combined in summation point 29 and then fed through an analog audio processor 30 to increase the average analog AM modulation, which extends the coverage region considerably. Such processors are commonplace at analog AM radio stations throughout the world. That signal is passed through a low pass filter 31 having a sharp cutoff characteristic, to produce a filtered monaural analog program signal on line 32. Filter 31 may, for example, have a cutoff frequency of 6 kHz and 40 dB attenuation beyond 6.5 kHz.

For those applications in which the analog and digital portions of transmitted signal will be used to convey the same program material, a digital source encoder 34, which may conform to the ISO MPEG Layer 2A, converts the right and left analog program signals to an encoded digital signal on line 36. A forward error correction encoder and interleaver circuit 38 improves data integrity over channels corrupted with impulsive noise and interference, producing a digital signal on line 40. For those instances where the digital signal to be transmitted is not a digital version of the analog program signal, a data port 42 is provided to receive the digital signal. An ancillary data source 44 is also provided for those instances in which the digital version of the analog program signal, or a digital signal supplied to port 42, is to be supplemented by including additional data.

Data parser 46 receives the digital data and produces a plurality of outputs on lines 48. The signals on pairs of lines 48 from the data parser 46 constitute complex coefficients that are in turn applied to a Fast Fourier Transform (FFT) algorithm in block 50, which generates the baseband in-phase, I, and quadrature, Q, components of the data signal on lines 52 and 54 respectively. The processed baseband analog AM signal is converted to a digital signal by analog-to-digital converter 60 and combined with the in-phase portion of the digital broadcast waveform at summation point 62 to produce a composite signal on line 64. The composite signal on line 64 is converted to an analog signal by analog-to-digital converter 66, filtered by low pass filter 68, and passed to a mixer 70 where it is modulated with a radio frequency signal produced on line 72 by a local oscillator 74. The quadrature signal on line 54 is converted to an analog signal by analog-to-digital converter 76 and filtered by low pass filter 78 to produce a filtered signal which is modulated in a second mixer 80, with a signal on line 82. The signal on line 72 is phase shifted as illustrated in block 84 to produce the signal on line 82. The outputs of mixers 70 and 80 are delivered on lines 86 and 88 to a summation point 90 to produce a composite waveform on line 92. The spurious mixing products are muted by bandpass filter 94, and the resulting digital broadcast signal is subsequently amplified by a power amplifier 96 for delivery to a transmitting antenna 98.

Figure 3:
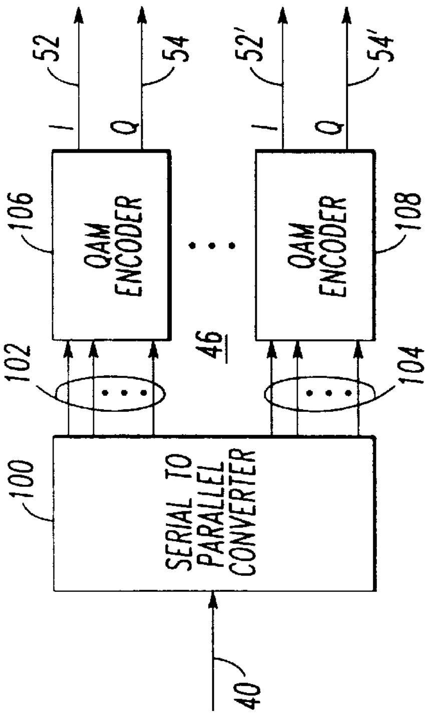
FIG. 3 is a block diagram of a data parser utilized within the transmitter shown in FIG. 2.

FIG. 3 is a block diagram of the data parser 46 of FIG. 2. The data parser includes a serial-to-parallel converter 100 which receives a serial digital signal, as illustrated by the input line 40, and produces a plurality of outputs in the form of digital signals on a plurality of groups of lines as illustrated by groups 102 and 104. Each group of lines feeds a QAM encoder, such as encoders 106 and 108, to produce an in-phase output signal I and a quadrature output signal Q.

Figure 4:
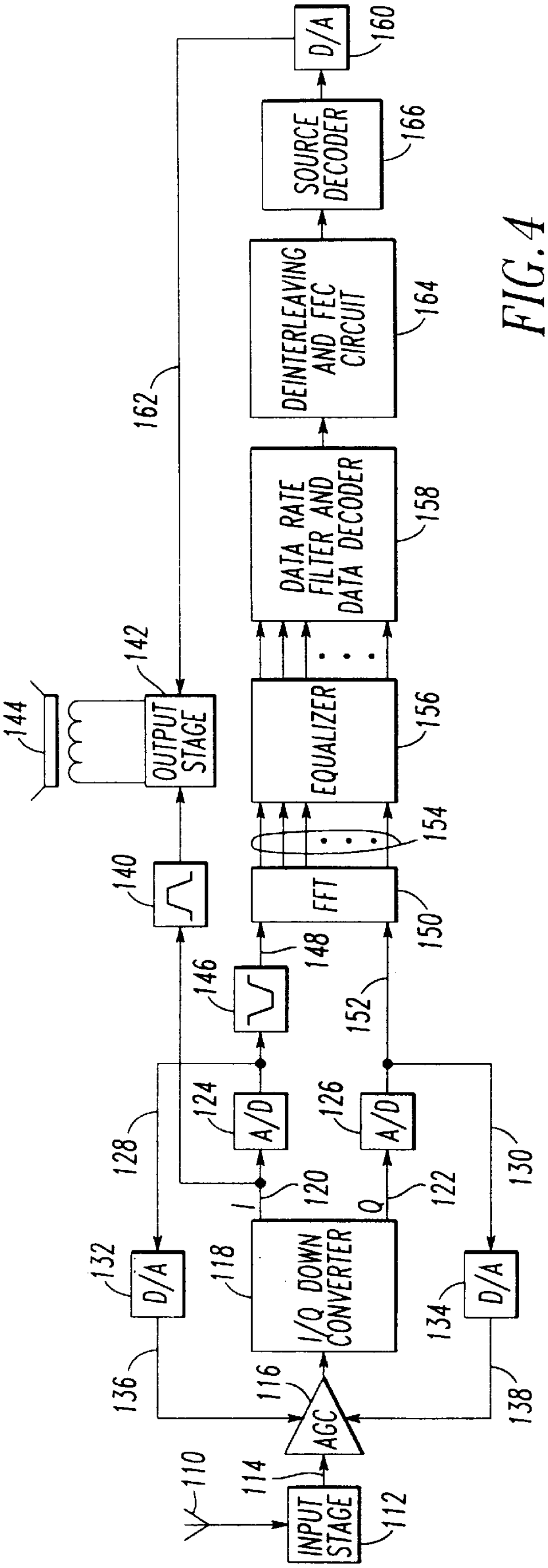
FIG. 4 is a block diagram of one embodiment of a receiver.

FIG. 4 is a block diagram of a receiver constructed to receive digital and analog signals. An antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through an automatic gain control circuit 116 to an I/Q down converter 118. The I/Q down converter produces an in-phase signal on line 120 and a quadrature signal on line 122. The in-phase channel output on line 120 is input to an analog-to-digital converter 124. Similarly, the quadrature channel output on line 122 is input to another analog-to-digital converter 126. Feedback signals on lines 128 and 130 are input to digital-to-analog converters 132 and 134, respectively. The digital-to-analog converter outputs on lines 136 and 138 are used to control the automatic gain control circuit 116. The signal on line 120 includes the analog AM signal which is separated out as illustrated by block 140 and passed to an output stage 142 and subsequently to a speaker 144 or other output device.

A band reject filter 146 filters the in-phase components on line 128 to eliminate the energy of the analog AM signal and to provide a filtered signal on line 148. A fast Fourier transform circuit 150 receives the digital signals on lines 148 and 152, and produces output signals on lines 154. These output signals are passed to an equalizer 156 and to a data rate filter and data decoder 158. The output of the data decoder is sent to a deinterleaving circuit and forward error correction decoder 164 in order to improve data integrity. The output of the deinterleaver/forward error correcting circuit is passed to a source decoder 166. The output of the source decoder is converted to an analog signal by a digital-to-analog converter 160 to produce a signal on line 162 which goes to the output stage 142.

The AM compatible digital broadcast waveform preferably minimizes the magnitude of changes necessary to convert existing AM radio stations to digital broadcast because the digital signal is completely within the FCC emissions mask for AM transmission. Therefore, it is expected that broadcasters can retain their existing transmit antennas. Their feed networks may need to be updated, however, since group delay variation in the channel needs to be reasonably constant to minimize intersymbol interference for the digital signal, a consideration that was less critical for analog AM transmissions. It is suspected that existing analog AM transmitters can be retained, provided that the power amplifier is operated in a reasonably linear mode. The primary hardware alteration would be to replace the low-level carrier input with an AM compatible digital broadcast exciter. This module generates both the analog and digital portions of the AM compatible digital broadcast modulation, and the transmitter therefore functions primarily as a linear amplifier.

The information sent by the digital signal can be different from the information sent by the analog amplitude modulated signal. Therefore, the methods of this invention can be used to transmit data of various types, such as traffic or weather information, video signals, station identification information, pager information or military communication signals, in combination with an amplitude modulated signal. Potential application areas include amplitude modulated military communications, and television signals in which the video information is amplitude modulated.

Figure 5:
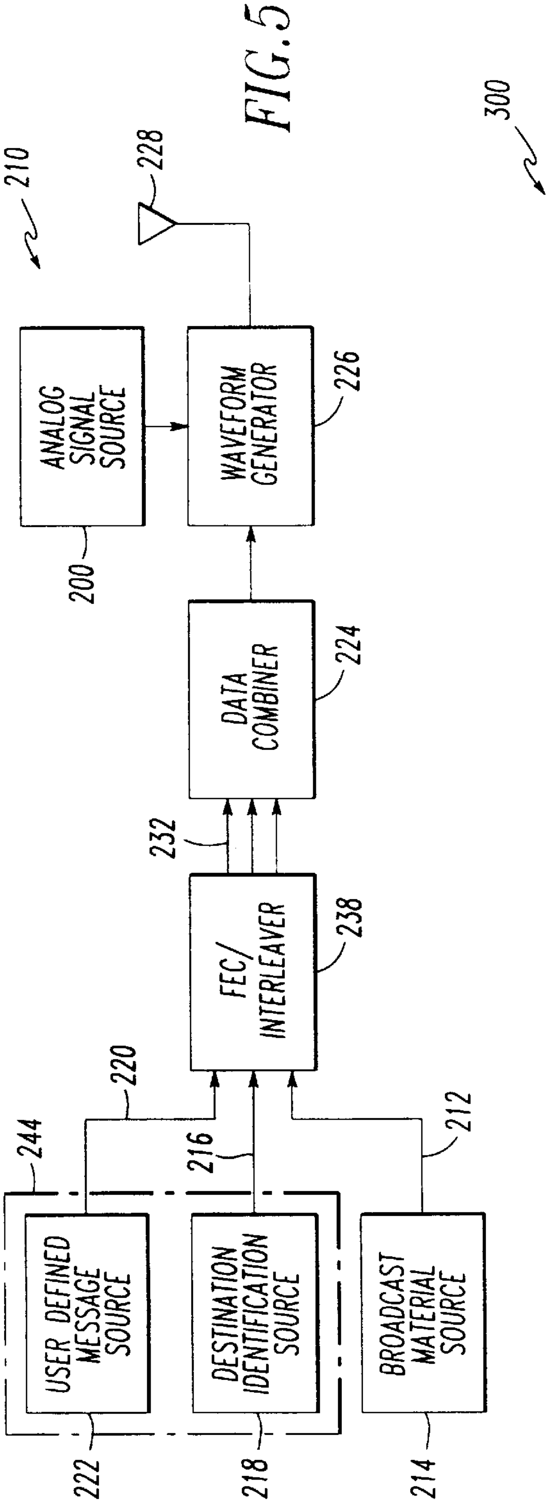
FIG. 5 is a block diagram of a transmitter in accordance with the present invention.

A first embodiment of a transmitter 210 for the receiver addressable AM compatible digital broadcast system in accordance with the present invention is shown in FIG. 5.

The transmitter 210 includes first input 212 for receiving a commercial broadcast program digital signal from source 214. Source 214 may supply a commercial broadcast program digital signal which is the same as the commercial broadcast program analog signal or may supply an alternate commercial broadcast program digital signal if the digital signal is different than the analog signal.

In addition, the transmitter 210 includes second input 216 for receiving a destination identification digital signal from source 218 and third input 220 for receiving a user defined message digital signal from source 222.

The destination identification digital signal may be a code which corresponds to specific receivers 300 within the detector addressable AM compatible digital broadcast system. Including a destination identification digital signal permits the transmitter 210 to communicate with specified receivers 300 within the AM compatible digital broadcast system. For example, the AM compatible digital broadcast system may incorporate paging functions wherein particular receivers 300 having the specified identification code will obtain the transmitted user defined message from source 222 upon receipt of a proper destination identification code.

The receiver 300 may be configured to process only the identification signal. Following detection of a proper identification signal, the receiver 300 may process the message portion.

Referring to FIG. 5, the commercial broadcast program digital signal, destination identification digital signal and user defined message digital signal are applied to an FEC/interleaver circuit 238. The parameters of the FEC/interleaver circuit 238 may be varied with the message type. The parameters for the FEC/interleaving may also differ for the message and identification information. Therefore, part of the message may be a header that indicates the type of message. The header information would be used to determine the FEC/interleaving processing at the receiver 300.

The output of the FEC/interleaver 238 may be applied to a data combiner 224 within the transmitter 210. Data combiner 224 forms a data stream in the form of an aggregate digital data signal containing the commercial broadcast program, destination identification and user defined message.

The data combiner 224 can use time-division multiplexing to combine its component signals. The non-program data could be sent during the same OFDM frame as the program data. Alternatively, the non-program data could be sent in a frame by itself. The second method may be preferable in terms of receiver design because a receiver desiring either only the program or non-program data would only need to demodulate only a portion of the OFDM frames. In addition, the identification signal can be broadcast prior to the corresponding message signal permitting processing of the message data only when the identification signal matches the receiver identification code.

The data combiner 224 preferably applies the aggregate digital signal to a waveform generator 226. The waveform generator 226 is additionally coupled with an analog source 200. Analog source 200 provides a commercial broadcast program analog signal which may have the same content as the broadcast program digital signal or may broadcast an entirely different program.

The commercial broadcast program analog signal and commercial broadcast program digital signal are combined within the waveform generator 226. Combining the broadcast program analog signal and broadcast program digital signal forms the AM compatible digital broadcast signal which may be transmitted via antenna 228.

Figure 6:
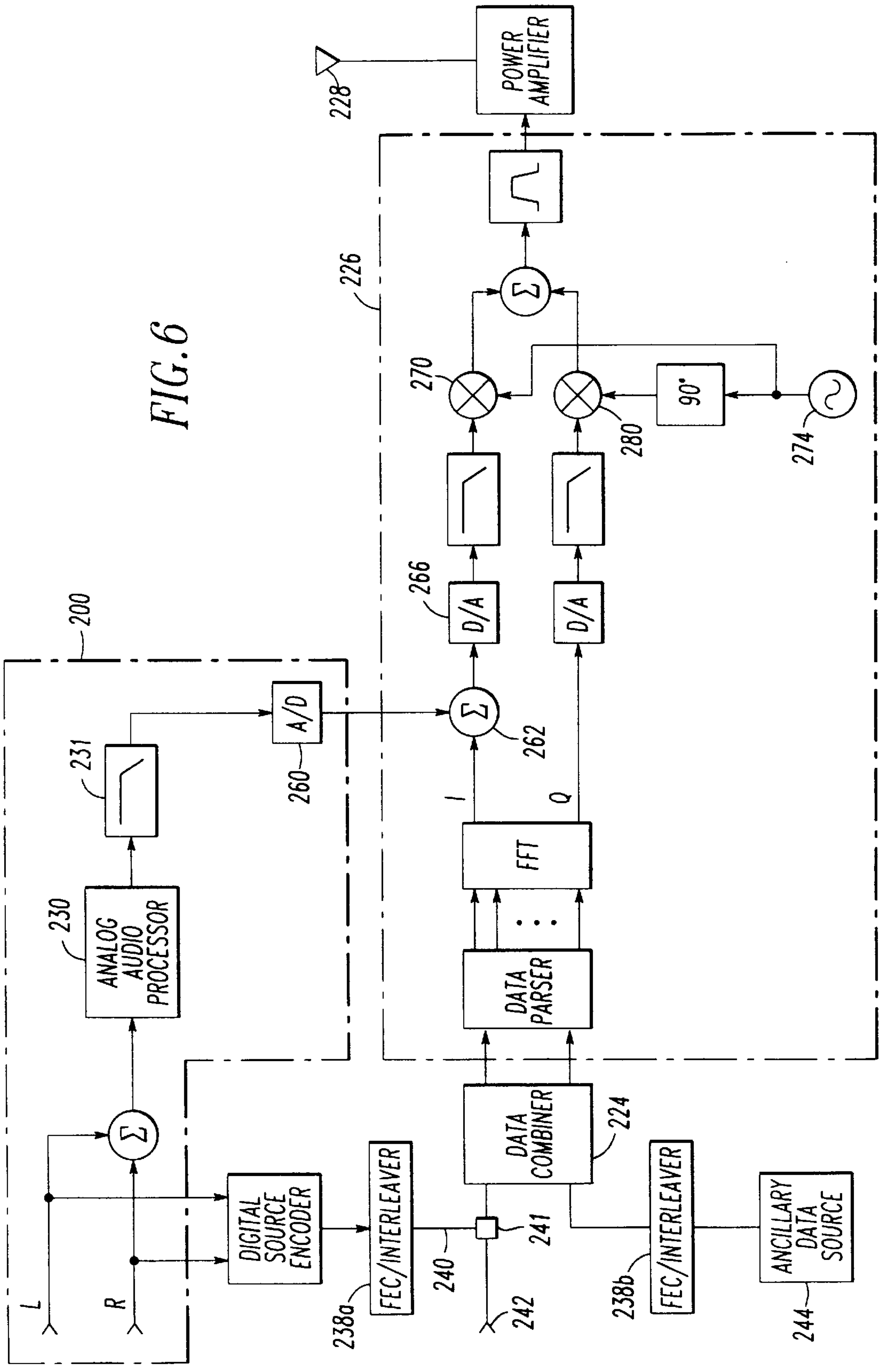
FIG. 6 is a detailed block diagram of one embodiment of the transmitter shown in FIG. 5.

The transmitter 210 in accordance with the present invention is shown in detail in FIG. 6. In particular, the broadcast program analog signal is processed within an analog audio processor 230, filtered within a low pass filter 231, and digitized within analog-to-digital converter 260 and applied to the waveform generator 226.

The digitized commercial broadcast program analog signal is combined with a portion of the aggregate digital signal at a summation point 262 within the waveform generator 226. In particular, the broadcast program analog signal is combined with the in-phase portion of the aggregate digital signal.

The combined digital signal is applied to a digital-to-analog converter 266 to generate a baseband analog signal. The baseband analog signal is mixed with a radio frequency signal supplied by local oscillator 274 with mixer 270 creating the in-phase portion of the digital broadcast signal.

The quadrature portion of the digital broadcast signal is generated in the same manner and is output from mixer 280. The quadrature portion of the digital baseband signal is modulated with a 90° phase shifted version of the radio frequency carrier to generate the quadrature portion of the digital broadcast signal. The mixer outputs are summed to form the composite digital broadcast signal which is subsequently filtered, amplified and transmitted via antenna 228.

Signal 240 contains digital commercial broadcast program material containing the same program material as the analog program signal. However, input 242 may be utilized to broadcast an alternate commercial broadcast program digital signal which varies from the analog program material. The input 242 may be coupled with an FEC/interleaver (not shown) if such encoding is desired.

The original broadcast digital signal on line 240 and alternate broadcast digital signal on line 242 may be applied to a switch 241. Switch 241 controls the flow of data depending on whether the digital signal from line 240 or 242 is broadcast.

FEC/interleaver 238 may comprise separate circuits as shown in FIG. 6 and provide encoding of different parameters. In particular, the broadcast digital signal may be applied to first FEC/interleaver 238*a*. Ancillary data source 244, including source 218 for providing the destination identification digital signal and source 222 for providing the user defined message, may be applied to the second FEC/interleaver 238*b*.

The output of the switch 241 and the output of second FEC/interleaver 238*b* (signal 232) are applied to combiner 224. The combiner 224 forms the aggregate digital signal from the commercial broadcast program, the user defined message digital signal and the destination identification digital signal. A source encoder may be utilized intermediate ancillary data source 244 and combiner 224 if the ancillary data contains voice, video, music or other program material for which source encoding is useful.

Figure 7:
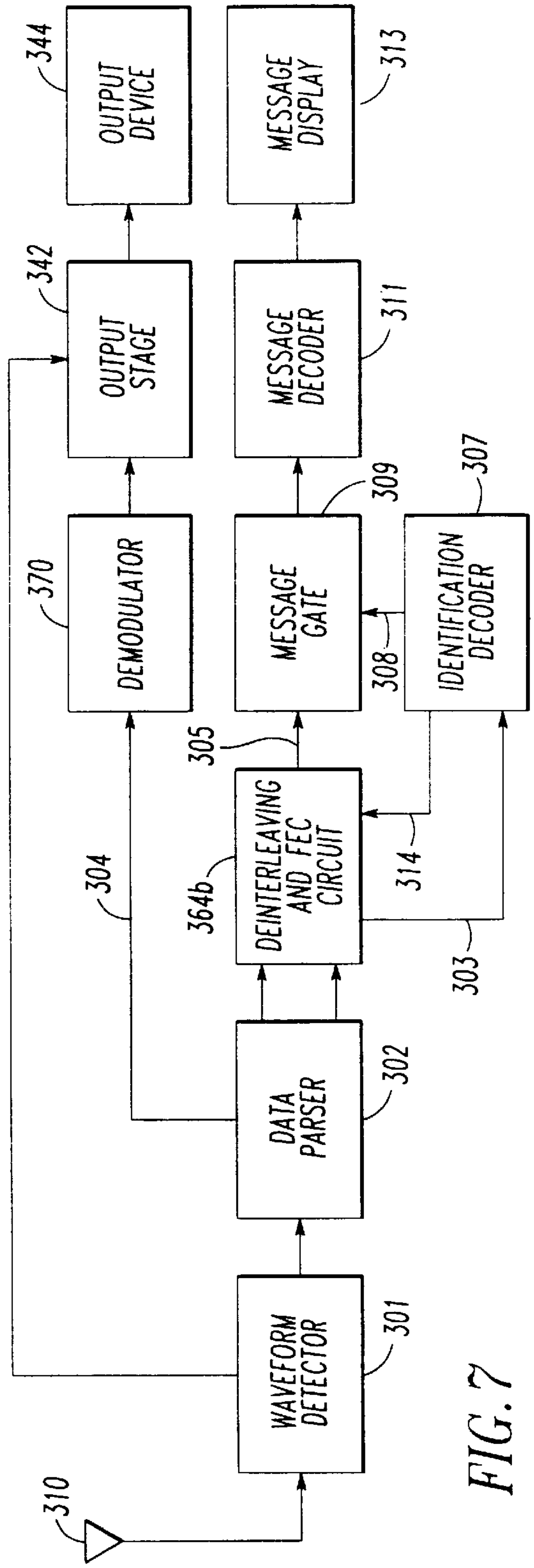
FIG. 7 is a block diagram of a receiver in accordance with the present invention.

The detector addressable AM compatible digital broadcast system also includes receiver 300 as shown in FIG. 7. The over-the-air AM compatible digital broadcast signal is received by antenna 310. The received signal is applied to waveform detector 301. Waveform detector 301 separates the commercial broadcast program analog signal from the aggregate digital data stream signal. However, it is not necessary to extract the analog signal in some applications such as paging.

The commercial broadcast program analog signal is applied to output stage 342 which may be coupled with an output device 344. The aggregate digital data stream is applied to data parser 302. Data parser 302 separates the destination identification digital signal, the received commercial broadcast program digital signal and the user defined message digital signal.

The received commercial broadcast program digital signal is applied to demodulator 370 via line 304. The resulting demodulated signal is applied to an output stage 342. It is not necessary to extract the broadcast program digital signal in some applications such as paging. The portion of data parser output that corresponds to the message and identification signals is applied to the deinterleaving and FEC circuit 364*b*. The resulting identification signal is output on line 303 and the message signal is output on line 305. The destination identification signal is applied via line 303 to an identification decoder 307 for generating a gate signal 308.

Decoder 307 may additionally generate signal 314 that can direct circuit 364*b* to use certain parameters for deinterleaving and FEC dependent on the message type. Decoder 307 may determine the message type based upon header information that is included with the identification information.

A gate signal is generated in response to the reception of a destination identification signal which corresponds to the identification code of the respective receiver 300.

Each receiver 300 preferably has an individual identification code thereby permitting identification of specific receivers 300 and providing a detector addressable AM compatible digital broadcast system in accordance with the present invention.

The user defined message signal and gate signal (if present) are applied via lines 305, 308, respectively, to message gate 309. Upon receiving the gate signal, the message gate 309 applies the user defined message signal to message decoder 311. The message decoder 311 decodes the user defined message signal and applies the decoded message to a message display 313 for conveying the message to the recipient.

Figure 8:
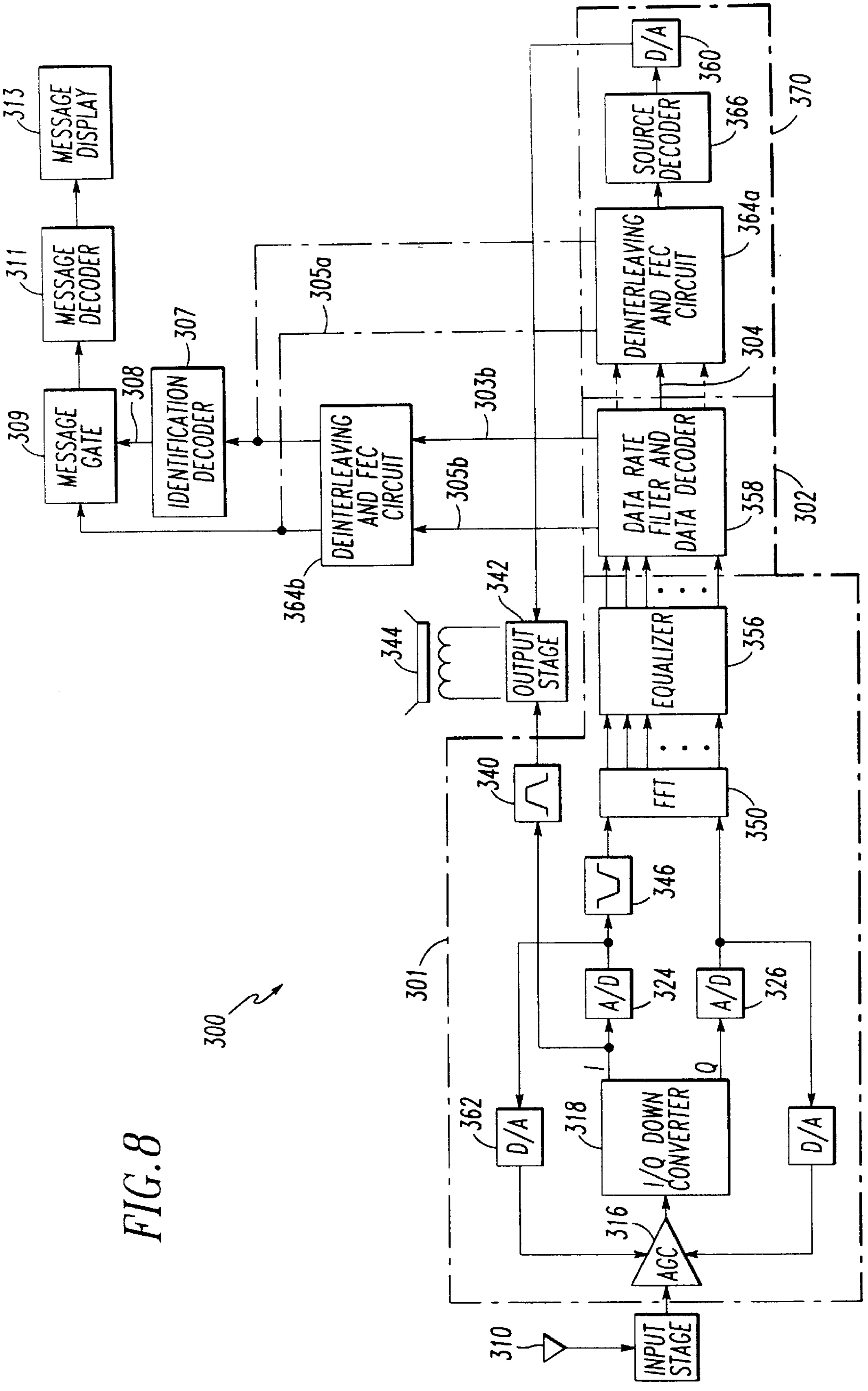
FIG. 8 is a detailed block diagram of one embodiment of the receiver shown in FIG. 7.

Referring to FIG. 8, a preferred embodiment of the receiver 300 in accordance with the present invention for receiving the digitally modulated signals and analog amplitude modulated signals is shown.

The digitally modulated signals and analog amplitude modulated signals are received at antenna 310 and applied to waveform detector 301. Waveform detector 301 separates the commercial broadcast program analog signal from the digitally modulated signals (commercial broadcast program digital signal, destination identification digital signal and user defined message digital signal).

In particular, the commercial broadcast program analog signal may be applied to output stage 342 and an output device 344 (such as an audio speaker) via lowpass filter 340. Filter 340 extracts the analog signal from the digital broadcast signal. The digital-to-analog converter 362, lowpass filter 340, output stage 342, and output device 344 are not required if the receiver 300 is intended to receive only the destination identification signal and user defined message digital signal.

The digitally modulated signals are applied in an aggregate data stream to data rate filter and data decoder 358. The digital signals forming the aggregate data stream are separated within the data parser 302 into the commercial broadcast program digital signal, user defined message digital signal and destination identification digital signal.

The commercial broadcast program digital signal is preferably applied via line 304 to deinterleaving and FEC circuit 364*a* and source decoder 366 and converted to an analog signal within digital-to-analog converter 360. The digital commercial broadcast program material may thereafter be applied to output stage 342 or an alternative output stage (not shown). The first deinterleaving and FEC circuit 364*a*, source decoder 366, digital-to-analog converter 360, output stage 342, and output device 344 are not required if the receiver 300 is intended to receive only the destination identification digital signal and user defined message digital signal. Also, AGC circuit 316, A/D converters 324 and 326, filter 346, FFT circuit 350, and equalizer 356 may not be needed or could be simplified in construction in certain embodiments, such as if the user defined message digital signal and destination identification digital signal are transmitted on a single digital carrier or a group of digital carriers.

In a first embodiment, the ancillary data (destination identification digital signal and user defined message digital signal) is separated from the commercial broadcast program digital signal by data parser 302 and applied to a second deinterleaving and FEC circuit 364*b*. Different interleaving and FEC codes may be utilized with the ancillary data and the commercial broadcast program digital signal with multiple deinterleaving and FEC circuits.

The output of the second deinterleaving and FEC circuit 364*b*, including destination identification digital signal and user defined message digital signal, may be applied to an identification (PIN) decoder 307 and message gate 309, respectively. Upon reception of proper receiver identification, the user defined message may be passed via message gate 309 to the message decoder 311 and an output device, such as a message display 313. A source decoder may be utilized intermediate message decoder 311 and message display 313 if the ancillary data contains material that has been encoded prior to transmission.

In a second embodiment (represented by the dashed lines in FIG. 8), the ancillary data within digital signal is applied to deinterleaving and FEC circuit 364*a*. Thereafter, ancillary data is applied to the message gate 309, identification (PIN) decoder 307, message decoder 311 and message display 313 as previously described. The same interleaving and FEC data encoding is applied to both the commercial broadcast program digital signal and ancillary data in the second embodiment.

While preferred embodiments of the invention have been shown and described herein, it will be appreciated by those skilled in the art that various modifications and alternatives to the disclosed embodiments may be developed in light of the overall teachings of the disclosure. Accordingly, the disclosed embodiments are meant to be illustrative only and not limiting to the scope of the invention which is to be given the full breadth of the following claims and all equivalents thereof.

What is claimed is:

1. A transmitter for concurrently transmitting digitally modulated signals and an analog signal within a digital broadcast signal, said transmitter comprising:

- an audio processor coupled with at least one analog input terminal for processing a commercial broadcast program analog signal;
- an analog-to-digital converter for digitizing said commercial broadcast program analog signal to produce a digitized commercial broadcast program signal;
- an interleaver for interleaving said commercial broadcast program signal, a destination identification digital signal, and a user defined message digital signal;
- a data combiner coupled to said interleaver for generating an aggregate digital data signal; and
- a waveform generator electrically coupled with said data combiner and said analog input terminal for combining said aggregate digital data signal with said analog signal to form said digital broadcast signal.

2. The transmitter of claim 1 wherein said destination identification digital signal is an identification code which corresponds to at least one receiver within a digital broadcast system.

3. The transmitter of claim 1 wherein said waveform generator further comprises a summation point electrically coupled with said data combiner and said analog-to-digital converter for combining a portion of said aggregate digital data signal with said digitized commercial broadcast program signal, and at least one digital-to-analog converter electrically connected to said summation point for generating a baseband analog signal, and a mixer electrically connected to said at least one digital-to-analog converter for modulating said baseband analog signal with a radio frequency signal to generate a first portion of said digital broadcast signal.

4. The transmitter of claim 1 wherein a frequency range of said digitally modulated signals encompasses a frequency spectrum of said analog signal.

5. An addressable communication system for AM compatible digital broadcasting, comprising:

- a transmitter including an interleaver coupled to a data combiner for generating an aggregate digital data signal from a plurality of digitally modulated signals including a commercial broadcast program signal, a destination identification signal and a user defined message signal, and a waveform generator for combining said aggregate digital data signal with an analog signal to form a digital broadcast signal, wherein said transmitter further includes an audio processor coupled with at least one analog input terminal for processing said commercial broadcast program signal and an analog-to-digital converter intermediate said audio processor and said waveform generator for digitizing said commercial broadcast program signal; and
- a plurality of receivers for receiving said digital broadcast signal and selected ones of said receivers displaying said user defined message signal responsive to said destination identification signal corresponding to an identification code of said selected ones of said receivers.

6. The addressable communication system of claim 5 wherein said waveform generator further comprises a summation point electrically coupled with said data combiner and said analog-to-digital converter for combining a portion of said aggregate digital data signal with said commercial broadcast program signal, and at least one digital-to-analog converter electrically connected to said summation point for generating a baseband analog signal, and a mixer electrically connected to said at least one digital-to-analog converter for modulating said baseband analog signal with a radio frequency signal to generate a portion of said digital broadcast signal.

7. The addressable communication system of claim 5 wherein a frequency range of said digitally modulated signals encompasses a frequency spectrum of said analog signal.

8. The addressable communication system of claim 5 wherein each of said receivers comprises a waveform detector for separating said digitally modulated signals and said analog signal, and a data parser electrically connected to said waveform detector for separating said destination identification signal and said user defined message signal, and a message gate electrically connected to said data parser for selectively passing said user defined message signal responsive to said destination identification signal corresponding to an identification code of a respective one of said receivers.

9. The addressable communication system of claim 8 further comprising an identification decoder electrically connected to said data parser and said message gate for comparing said destination identification signal with said identification code.

10. The addressable communication system of claim 8 wherein said waveform detector uses the phase of a carrier signal of said analog signal as a phase reference to demodulate said digitally modulated signals.

11. The addressable communication system of claim 8 wherein said waveform detector includes a filter for extracting said analog signal.

12. The addressable communication system of claim 6 wherein each of said receivers comprises a waveform detector for separating said digitally modulated signals and said analog signal, and a data parser electrically connected to said waveform detector for separating said destination identification signal and said user defined message signal, and a message gate electrically connected to said data parser for selectively passing said user defined message signal responsive to said destination identification signal corresponding to an identification code of a respective one of said receivers.

* * * * *